(12) United States Patent
Graves et al.

(10) Patent No.: US 10,474,170 B2
(45) Date of Patent: Nov. 12, 2019

(54) THERMOSTATIC SHOWER VALVE

(71) Applicant: Acorn Engineering Company, City of Industry, CA (US)

(72) Inventors: James C. Graves, Lake Forest, IL (US); Boris Quijada, Beach Park, IL (US); Thomas O'Brien, Antioch, IL (US)

(73) Assignee: Acorn Engineering Company, City of Industry, CA (US)

( * ) Notice: Subject to any disclaimer, the term of this patent is extended or adjusted under 35 U.S.C. 154(b) by 253 days.

(21) Appl. No.: 14/544,070

(22) Filed: Nov. 20, 2014

(65) Prior Publication Data

US 2015/0331431 A1 Nov. 19, 2015

Related U.S. Application Data (60) Provisional application No. 61/996,805, filed on May 15, 2014.

(51) Int. Cl.
*G05D 23/13* (2006.01)

(52) U.S. Cl.
CPC ....... *G05D 23/1353* (2013.01); *G05D 23/134* (2013.01)

(58) Field of Classification Search
CPC ........... G05D 23/1353; G05D 23/1346; G05D 23/132; G05D 23/134; G05D 7/0133; Y10T 137/86823; Y10T 137/86743; F16K 11/07; F16K 11/0716
USPC ...................................................... 236/12.16
See application file for complete search history.

(56) References Cited

U.S. PATENT DOCUMENTS

| | | | |
|---|---|---|---|
| 4,029,256 A * | 6/1977 | Dauga ................ | G05D 23/1353 236/12.2 |
| 4,610,393 A * | 9/1986 | Rodriguez .......... | F16K 11/0746 137/607 |
| 4,669,653 A * | 6/1987 | Avelov ............... | G05D 23/1353 137/625.41 |
| 4,946,134 A * | 8/1990 | Orlandi .................... | F16K 3/08 137/625.31 |
| 5,433,378 A | 7/1995 | Orlandi | |
| 5,931,374 A | 8/1999 | Knapp | |
| 7,163,157 B2 | 1/2007 | Goncze et al. | |
| 7,845,574 B2 | 12/2010 | Mace | |
| 7,850,088 B2 | 12/2010 | Wei et al. | |
| 2001/0007336 A1* | 7/2001 | Jelloul ............... | G05D 23/1346 236/12.11 |

(Continued)

OTHER PUBLICATIONS

CeramTec, "The Most Well-known Oxide Ceramic Material", Apr. 2012.*

*Primary Examiner* — Christopher R Zerphey
*Assistant Examiner* — Schyler S Sanks
(74) *Attorney, Agent, or Firm* — Eric J. Sosenko; Jonathan P. O'Brien; Honigman LLP (57) ABSTRACT

Embodiments include thermostatic valves for showers and tubs in which the temperature is regulated by a thermostatic motor/element. Both the flow from the valve and the temperature are controlled by a rotary stem. Hot and cold water is pre-mixed by passage through the coils of a return spring into a mixing chamber and a ceramic valve at the top of the mixing chamber controls flow of mixed water from the mixing chamber into an outlet chamber where fluctuations in the water temperature are eliminated before the water is conveyed to the shower or tub.

20 Claims, 8 Drawing Sheets

(56) References Cited

U.S. PATENT DOCUMENTS

| | | | |
|---|---|---|---|
| 2003/0234295 A1 | 12/2003 | Mace et al. | |
| 2004/0046037 A1* | 3/2004 | Swadling | G05D 23/1346 236/12.11 |
| 2005/0116053 A1* | 6/2005 | Goncze | G05D 23/1346 236/12.11 |
| 2011/0127339 A1* | 6/2011 | Li | F16K 11/0743 236/12.1 |

* cited by examiner

THERMOSTATIC SHOWER VALVE

BACKGROUND OF THE INVENTION

Field of the Invention

Embodiments relate to thermostatic valves involving the mixing of fluids of dissimilar temperature in which supplies of fluids are controlled according to the temperature of the mixed fluids by a reciprocating valve.

Thermostatic valves are used to control the temperature of water supplied to showers and baths. Such valves function by using a temperature sensitive regulator, often a thermostatic motor/element, to regulate the relative volumes of hot and cold water supplied to the shower or bath. Rapid variations in the temperature, pressure, or flow rate of the hot and cold water supplied to thermostatic valves may cause corresponding variations in the temperature of the water supplied to the shower or bath. Embodiments of the present disclosure minimize or eliminate such variations.

The foregoing examples of the related art and limitations related therewith are intended to be illustrative and not exclusive. Other limitations of the related art will become apparent to those of skill in the art upon a reading of the specification and a study of the drawings.

BRIEF SUMMARY OF THE INVENTION

The following embodiments and aspects thereof are described and illustrated in conjunction with systems, tool and methods which are meant to be exemplary and illustrative, not limiting in scope. In various embodiments, one or more of the above-described problems have been reduced or eliminated, while other embodiments are directed to other improvements.

Embodiments include thermostatic valves which comprise a body with a wall, hot and cold water inlets, a cartridge assembly, a mixing chamber located within the cartridge assembly, an outlet chamber located between the cartridge assembly wall and the body wall, a thermostatic motor/element, a shuttle moved by the thermostatic motor/element in a reciprocating motion, the shuttle controlling admission of hot and cold water through ports past a return spring into the bottom of the mixing chamber. The thermostatic motor/element and shuttle are located within the mixing chamber, a ceramic valve is located at the top of the mixing chamber and the ceramic valve controls movement of mixed water from the mixing chamber through ports in the wall of the cartridge assembly into the outlet chamber where the water temperature is stabilized. The ceramic valve is controlled by rotation of an internal valve stem and the preset relation of the shuttle to the hot and cold water ports also is controlled by the rotation of the internal valve stem. A stabilized water outlet is located at the bottom of the outlet chamber and the stabilized water outlet is connected to a shower outlet and a bath outlet.

In embodiments hot and cold water flow through ports past a return spring into the bottom of the mixing chamber, through the mixing chamber, through the ceramic valve at the top of the mixing chamber into the outlet chamber, and from the bottom of the outlet chamber into the stabilized water outlet, then into the shower and bath outlets.

In addition to the exemplary aspects and embodiments described above, further aspects and embodiments will become apparent by reference to the drawings and by study of the following descriptions.

DETAILED DESCRIPTION OF THE INVENTION

Figure 1:
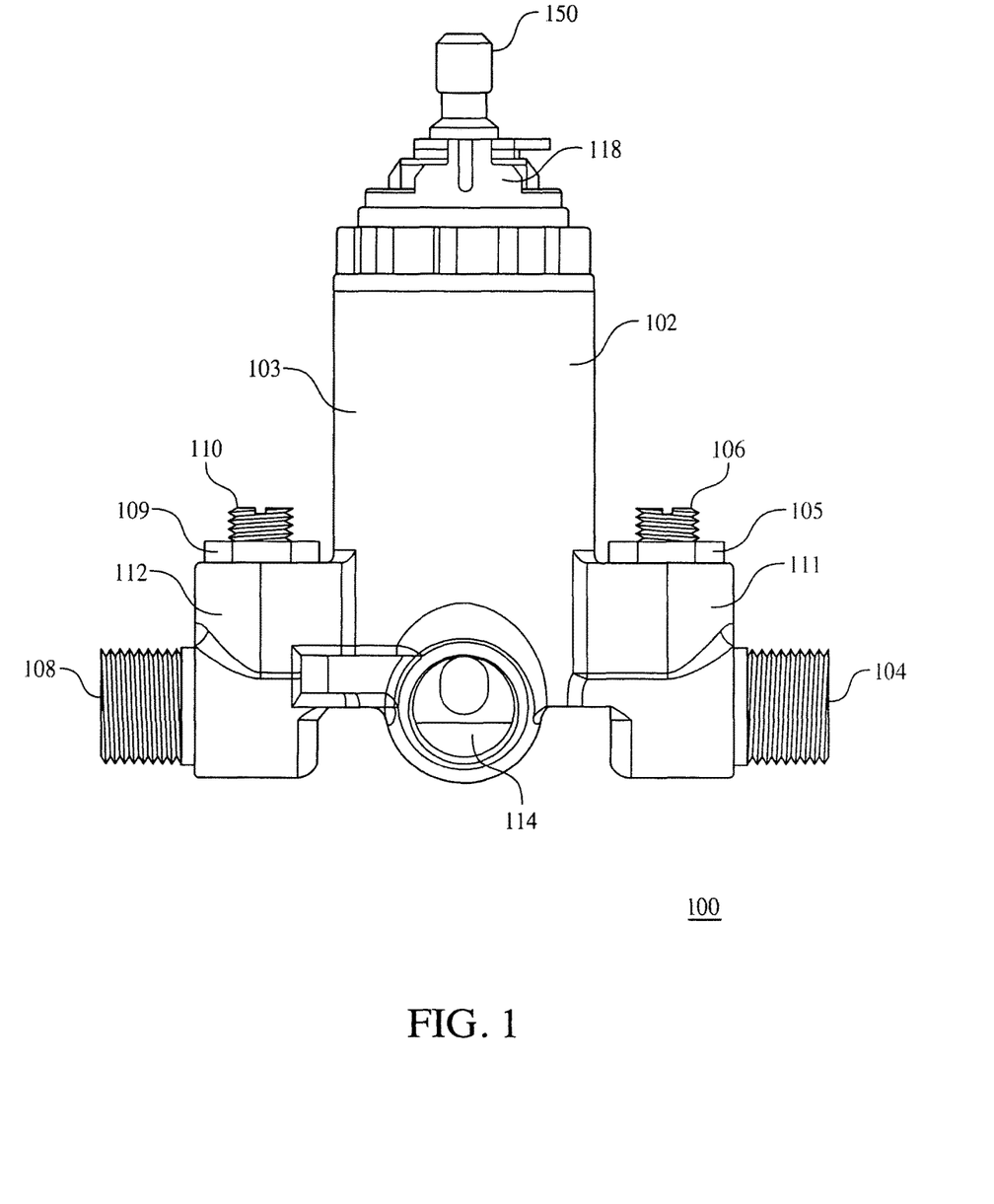
FIG. 1 is a side view of an embodiment thermostatic valve

FIG. 1 is a side view of an embodiment thermostatic valve 100. Visible in FIG. 1 is the generally cylindrical valve body 102, body wall 103, bonnet 118, external valve stem 150, hot water inlet 108, cold water inlet 104, tub outlet 114, cold water check-stop port 111, cold water supply stop 106, cold water check-stop bonnet lock 105, hot water check-stop port 112, hot water supply stop 110, and hot water check-stop bonnet nut 109. Also shown in FIG. 1, directly opposite of tub outlet 114 on the back side of the valve body 102, is a shower outlet 170.

Figure 2:
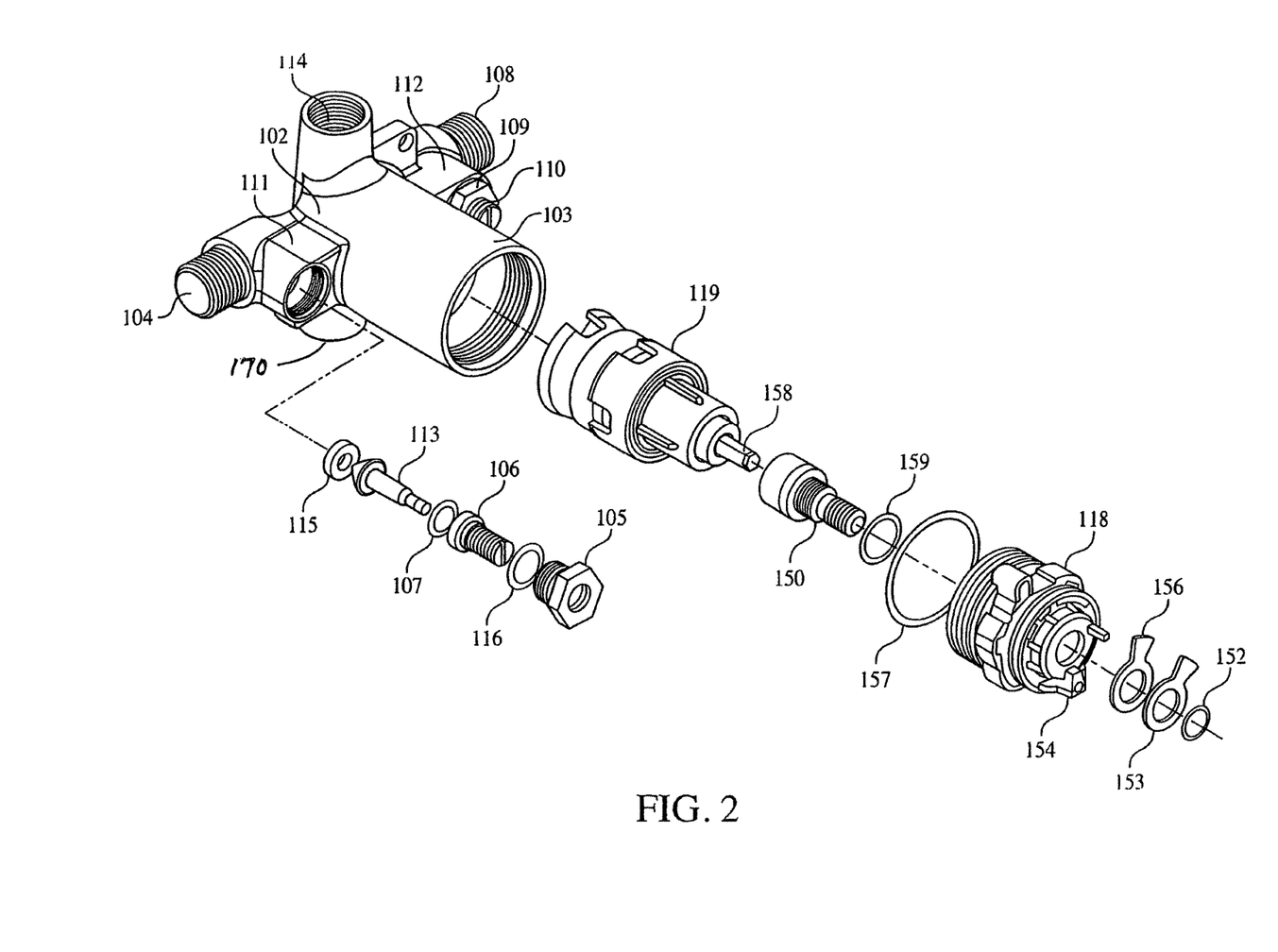
FIG. 2 is a partial exploded view of the embodiment thermostatic valve of FIG. 1.

FIG. 2 is a partial exploded view of the embodiment thermostatic valve FIG. 1. Visible in FIG. 2 is the generally cylindrical valve body 102, body wall 103, cold water inlet 104, cold water check-stop port 111 located between the cold water inlet 104 and the body 102, hot water inlet 108, and hot water check-stop port 112 located between the hot water inlet 108 and the body 102. Also visible is the hot water supply stop 110 and hot water check-stop bonnet nut 109. The check-stop valves allow interruption of flow of water into the thermostatic valve for maintenance purposes. The cold water check-stop port 111 is further shown in exploded view and comprises a cold water supply stop seat 115, cold water check-stop plunger 113, o-ring 107, cold water supply stop 106, o-ring 116, and cold water check-stop bonnet lock 105. The hot water check-stop valve comprises similar parts.

Also visible in FIG. 2 is a cartridge assembly 119 with an internal valve stem 158 which will be described in further detail below. An external valve stem 150 extends from and interacts with the internal valve stem 158. The external valve stem 150 extends through the bonnet 118 and a handle (not shown in FIG. 2) is attached to the external valve stem 150. Rotation of the handle causes rotation of the external valve stem 150 and rotation of the internal valve stem 158. This arrangement allows a non-rising relationship between the handle and the thermostatic shower valve. Rotation of the handle does not result in transverse movement of the external valve stem and attached handle in the plane perpendicular to the plane of rotation.

Also visible in FIG. 2 is a external valve stem o-ring 159 and a bonnet o-ring 157. A bonnet 118 covers the top of the thermostatic valve. A lower limit stop 156 and upper limit stop 152 interact with the bonnet limit stop 154 and limits the extent of rotation of the external valve stem 150. A retaining ring 153 secures the stop rings in place.

Figure 3:
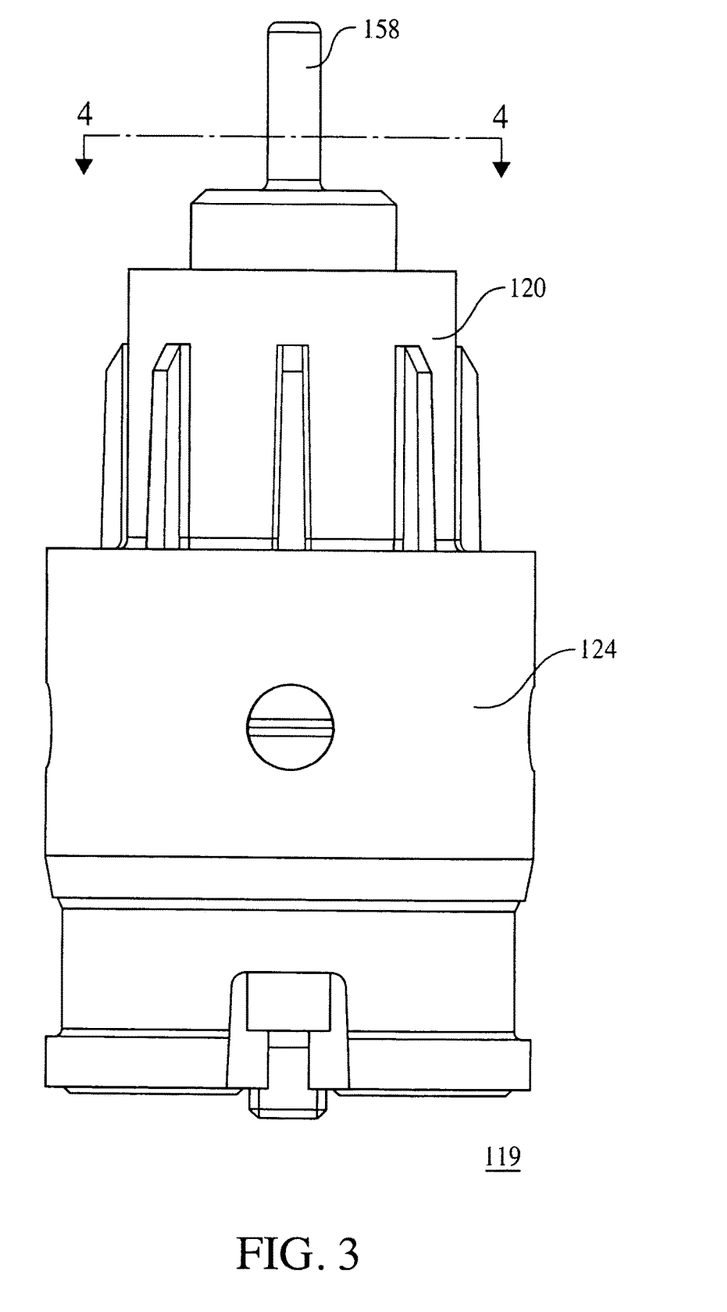
FIG. 3 is a side view of an embodiment cartridge assembly.

FIG. 3 is a side view of the cartridge assembly 119. The cartridge assembly comprises a cartridge base 124 surmounted by a cartridge bonnet 120. The internal valve stem 158 extends from the top of the cartridge bonnet 120.

Figure 4:
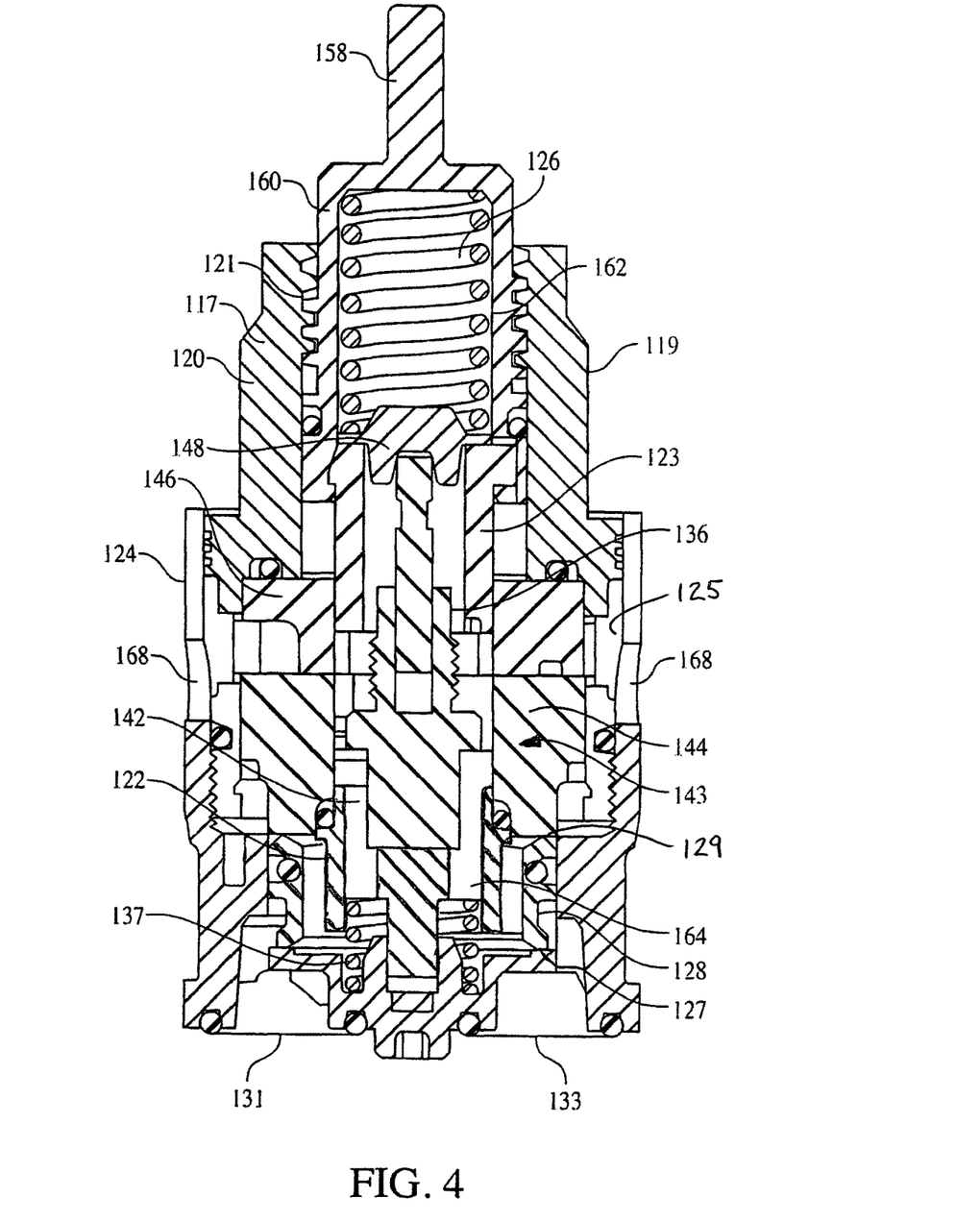
FIG. 4 is a cross-sectional view of the cartridge assembly of FIG. 3 taken at line 4-4 of FIG. 3.

FIG. 4 is a cross-sectional view of the cartridge assembly 119 of FIG. 3 taken at line 4-4 of FIG. 3. Visible in FIG. 4 is the cartridge base 124 with cartridge base wall 125. Attached by threads to the top of the cartridge base wall 125 is cartridge bonnet 120. Mixed water ports 168 are arrayed about the cartridge base wall 125. The internal stem 158 extends from the top of the cartridge assembly. Internal stem threads 162 on the outer surface of the internal stem interact with cartridge bonnet internal threads 121 on the inner surface of the cartridge bonnet wall 117. Rotation of the internal stem 158 causes longitudinal translation of the internal stem with reference to the cartridge assembly. A cylindrical slotted ceramic drive 123 transmits the rotation of the internal valve stem to the upper ceramic valve disk 146.

A overload spring 126 bears on and urges downward a overload spring adapter 148 which receives the top of a thermostatic motor/element. A cylindrical upper ceramic valve disk 146 interacts with a cylindrical lower ceramic valve disk 144 to form a ceramic disk valve 143 which controls passage of water through the thermostatic valve. A return spring 137 urges upward a shuttle 128 against a thermostatic motor/element 136. The shuttle 128 has on the upper circumference a shuttle cold water seat 129 and on the lower circumference a shuttle hot water seat 127. The shuttle cold water seat 129 controls the flow of cold water through the cold water port 133 down past the inner side of the shuttle and past the cylindrical mixing chamber wall 122 to the bottom of the mixing chamber wall where the cold water mixes with hot water in the return spring chamber 164 containing the return spring 137. The mixed water then flows into the mixing chamber 142. The hot water seat 127 controls flow of hot water through the hot water port 131 where it passes into the return spring chamber 164 containing the return spring 137, mixes with cold water, and passes into the mixing chamber 142. The passage of hot and cold water past the shuttle 128 and through the coils of the return spring 137 provides very efficient mixing of the hot and cold water. The thermostatic motor/element is surrounded by the mixing chamber 142 and is exposed to the flow of mixed hot and cold water.

Figure 5:
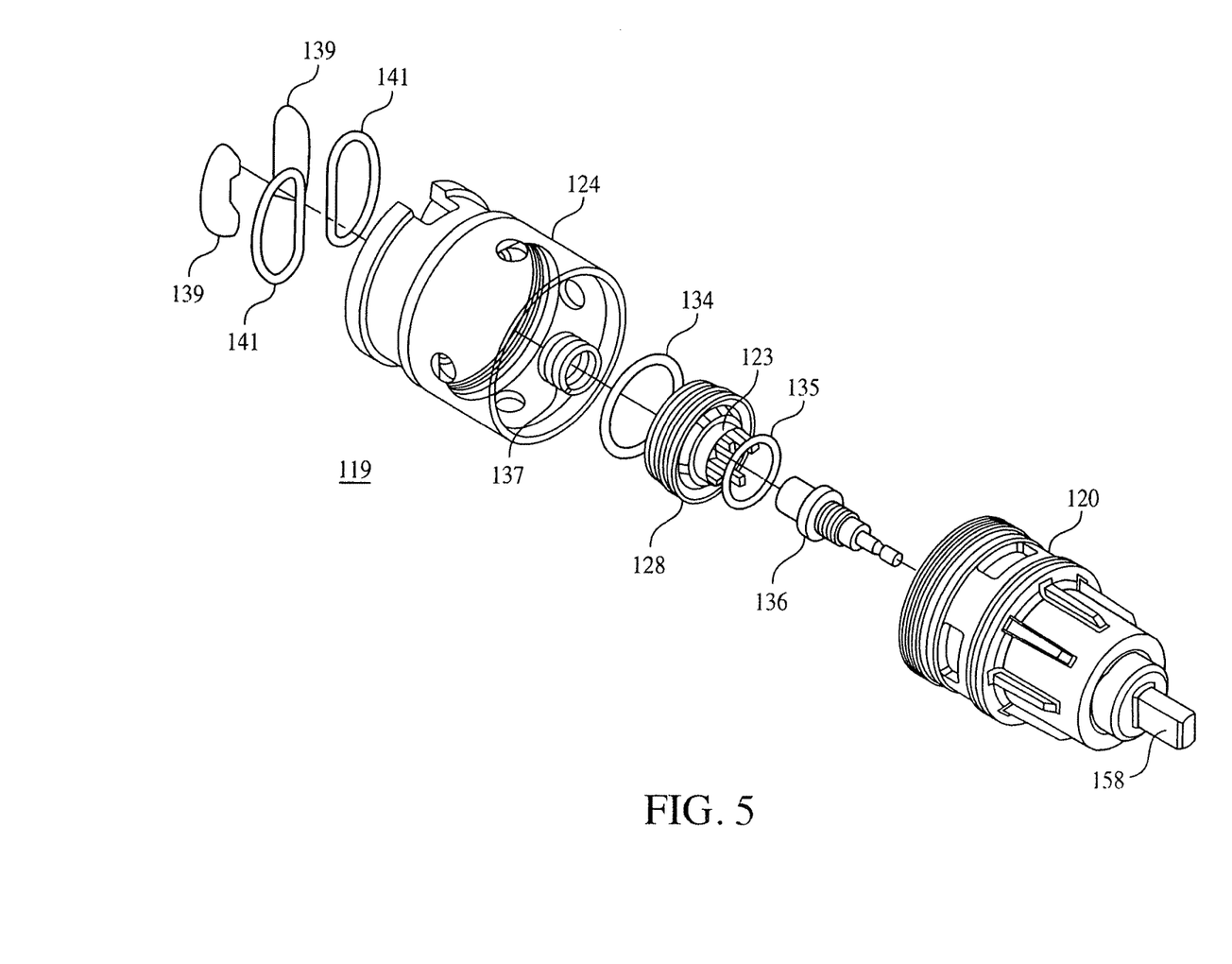
FIG. 5 is an exploded view of the cartridge assembly of FIG. 3.

FIG. 5 is a partial exploded view of an embodiment cartridge assembly 119 showing the relationships between some of the components. Visible in FIG. 5 is the cartridge base 124 with the hot and cold water inlet screens 139 and inlet o-rings 141 which cover the hot and cold water ports at the bottom of the cartridge base 124. Also visible is the return spring 137, lower shuttle o-ring 134, shuttle 128, shuttle cold water seat 129, shuttle hot water seat 127, and ceramic drive 123. The thermostatic motor/element 136 and upper shuttle o-ring 135 are also visible. The cartridge bonnet 120 is shown along with the internal valve stem 158 at the top of the cartridge bonnet.

Figure 6:
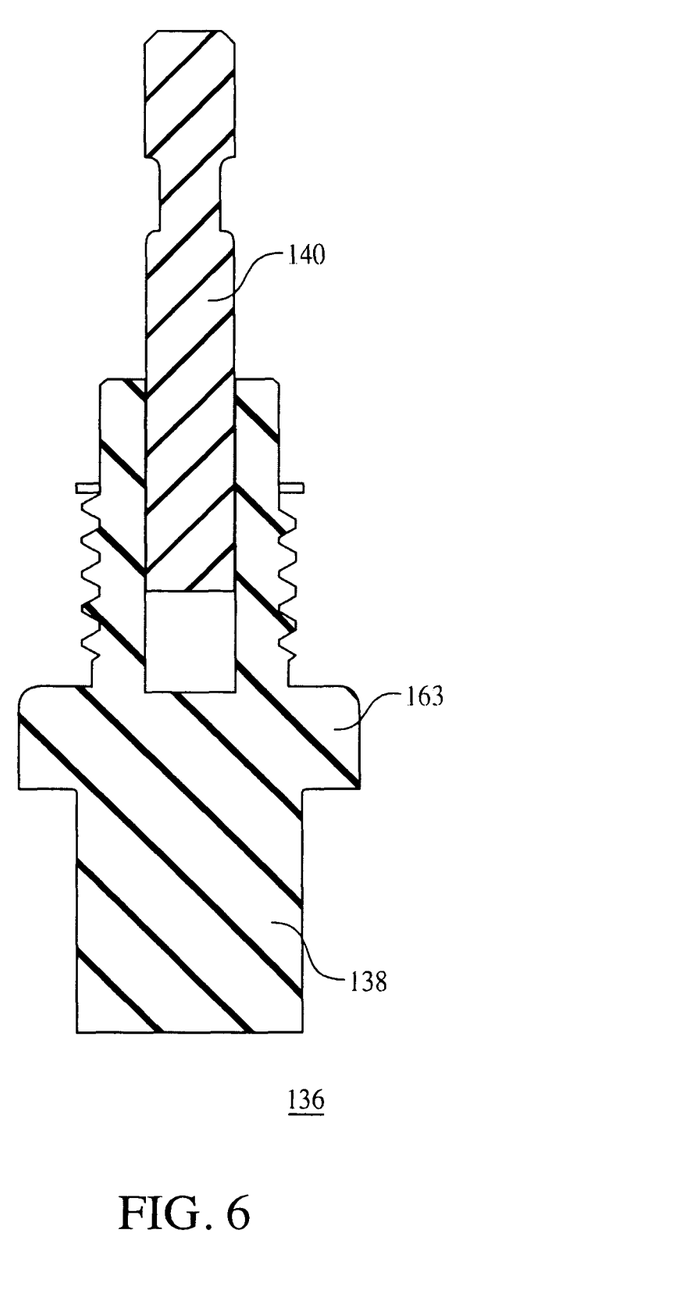
FIG. 6 is an axial cross-sectional view of an embodiment thermostatic motor/element.

FIG. 6 is an axial cross-sectional view of an embodiment thermostatic motor/element. Visible in FIG. 6 is the thermostatic motor/element body 138 with a thermostatic motor/element body shoulder 163. A thermostatic motor/element stem 140 extends from the top of the thermostatic motor/element.

Figure 7:
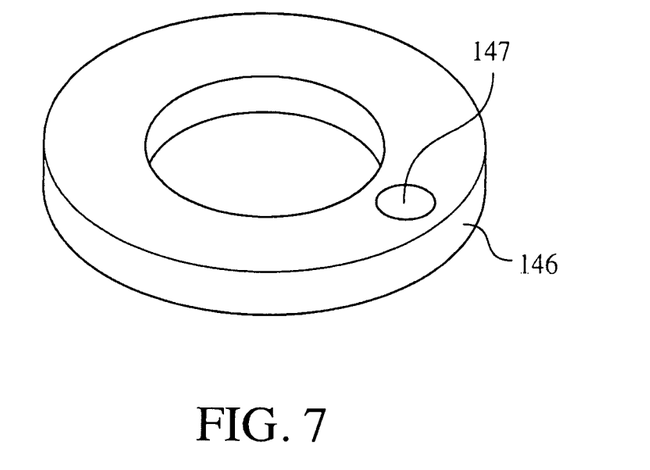
FIG. 7 is a perspective view of an upper ceramic valve disk.

FIG. 7 is a perspective view of a cylindrical upper ceramic valve disk 146. The disk is pierced by a hole 147.

Figure 8:
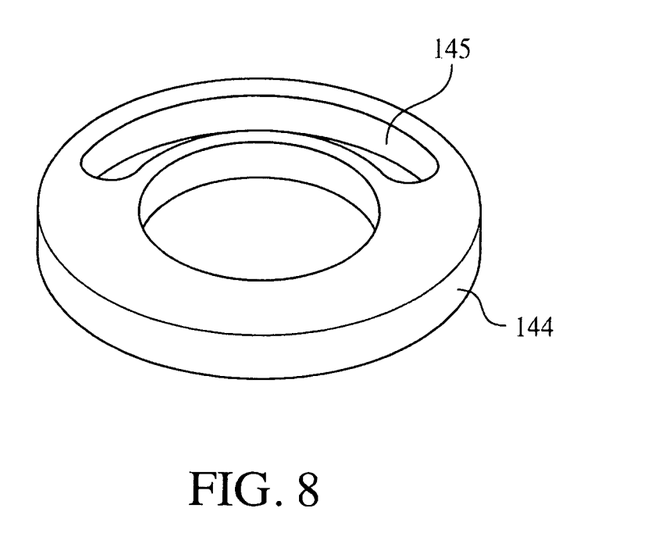
FIG. 8 is a perspective view of a lower ceramic valve disk.

FIG. 8 is a perspective view of a cylindrical lower ceramic valve disk 144. The disk is pierced by an arcuate cut 145.

Figure 9:
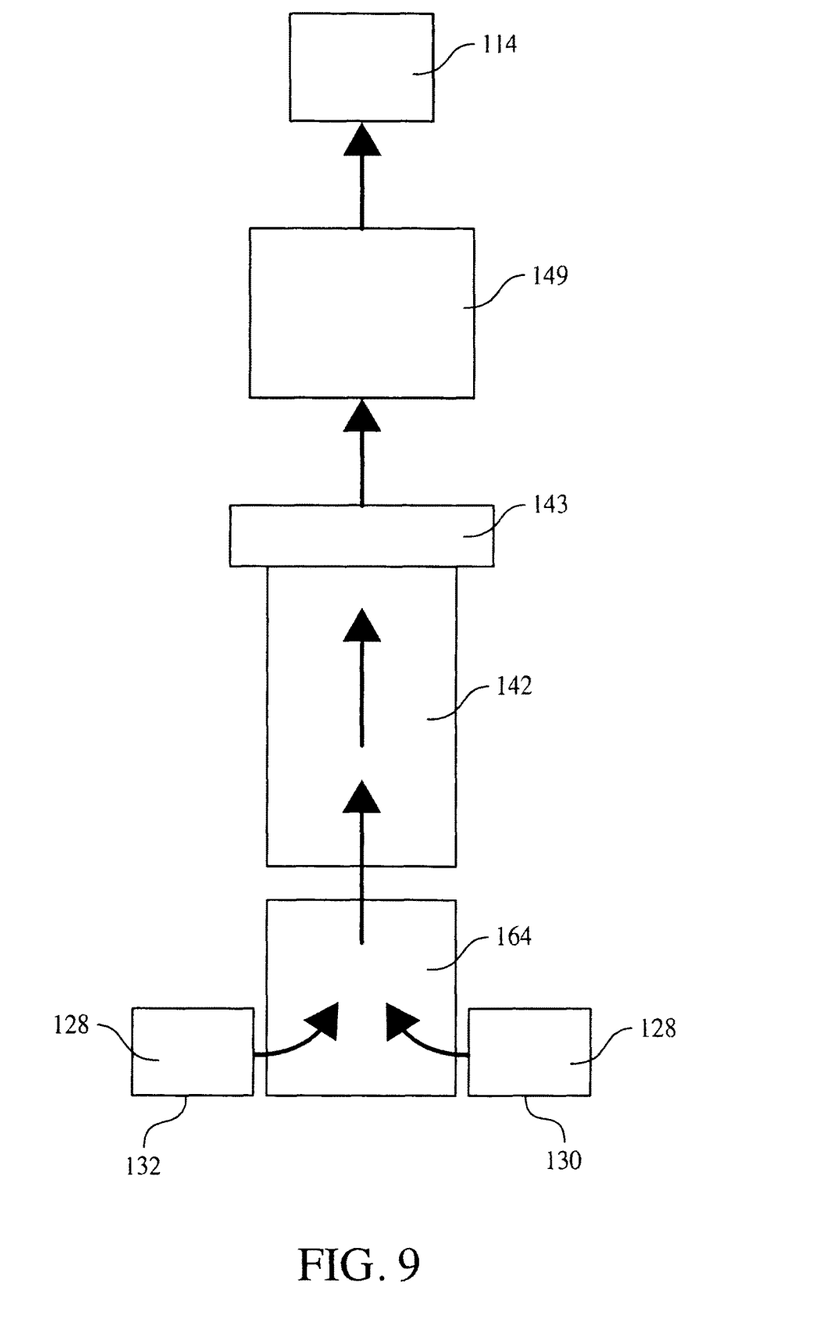
FIG. 9 is a schematic view showing the flow of water through an embodiment thermostatic valve.

FIG. 9 is a schematic view showing the flow of water through an embodiment thermostatic valve. The flow of cold water 130 enters through the cold water inlet and passes through a cold water port into the return spring chamber 164. Similarly the flow of hot water 132 is through the hot water inlet and enters the return spring chamber 164 through the hot water port. Passage through the hot and cold water ports is controlled by the reciprocal motion of the shuttle 128 which is motivated by the thermostatic motor/element and the return spring. Hot and cold water entering the valve is partially mixed by passage through the coils of the return spring in the return spring chamber 164. The partially-mixed water proceeds with additional mixing to the top of the mixing chamber 142, which surrounds the thermostatic motor/element. Flow of mixed water is controlled by ceramic disk valve 143. After passing through the mixed water ports the mixed water proceeds downward through the cylindrical outlet chamber 149 which surrounds the outside of the mixed water chamber 142. Water emerging from the outlet chamber 149 is termed tempered water. Tempered water is highly stabilized and uniform in temperature. At the bottom of the outlet chamber 149 the tempered water enters the tub outlet 114 or shower outlet, (not shown in FIG. 9).

In operation of embodiments, as in FIGS. 1 and 4, cold water flows into the cold water inlet 104 to the cylindrical cold water port 133, past the return spring 137 in the return spring chamber 164, and into the mixing chamber 142 which surrounds the thermostatic motor/element 136. Hot water flows into the hot water inlet 108 to the cylindrical hot water port 131, past the return spring 137 in the return spring chamber 164, and into the mixing chamber 142. The cold water port 133 is located above the hot water port 131. Flow of cold water through the cold water port 133 is controlled by the shuttle cold water seat 129 located on the upper edge of the cylindrical shuttle 128. Flow of hot water through the hot water port 131 is controlled by the shuttle hot water seat 127 located on the bottom edge of the cylindrical shuttle 128.

In embodiments, the predetermined location of the shuttle 128 determines the temperature of the water in the mixing chamber 142. This establishes the thermostatic character of the valve, that is, the temperature of the water emerging from the valve into the tub or shower is constant, despite variations in the temperature or pressure of the hot or cold water supply.

If, for example, the water in the mixing chamber 142 is hotter than the predetermined temperature, expansion of the thermostatic motor/element forces the shuttle down, thereby reducing the flow through or closing the hot water port 131 and simultaneously increasing the flow through or opening the cold water port 133. Conversely, if the water in the mixing chamber 142 is colder than the predetermined temperature, contraction of the thermostatic motor/element allows the return spring 137 to force the shuttle up, thereby reducing the flow through or closing the cold water port 133 and simultaneously increasing the flow through or opening the hot water port 131.

The predetermined temperature is set by moving the shuttle 128 up and down in the mixing chamber 142. Rotation of the external valve stem 150 causes rotation of the internal valve stem 158. Since the internal valve stem 158 has a threaded connection to the cartridge bonnet 120 via the internal stem threads 162 and the cartridge bonnet internal threads 121, rotation of the internal valve stem causes the internal valve stem to move up and down within the mixing chamber 142. The thermostatic motor/element 136 is urged against overload spring adapter 148 by return spring 137. Since shuttle 128 is fixedly attached to the thermostatic motor/element body 138, rotation of the external valve stem 150 causes reciprocal movement of the shuttle 128 up and down within the mixing chamber 142. Such movement sets the desired temperature of the water which emerges from the thermostatic valve.

Rotation of the external valve stem 150 not only controls the preset temperature of water from the valve, but also controls the flow of water from the thermostatic valve by means of the ceramic valve 143. Ceramic valve 143 is located at the top of mixing chamber 142. When the ceramic valve is open flow of mixed water from mixing chamber 142 through mixed water ports 168 in the cartridge base wall 125 into the outlet chamber 149 occurs. The temperature of the water is stabilized in the outlet chamber 149 and the now stabilized water subsequently flows into the tub outlet 114 and the shower outlet 170.

The cylindrical ceramic valve 143 is comprised of stationary lower ceramic valve disk 144 and a cylindrical upper ceramic valve disk 146. The upper disk is mounted coaxially with the external valve stem 150 and is attached via the internal valve stem 158, internal stem 160, and ceramic drive 123 so that rotation of the external valve stem 150 causes rotation of the upper ceramic valve disk 146. Rotation of the external valve stem 150 is constrained by the interaction of lower limit stop 156, upper limit stop 152, and bonnet limit stop 154 on the valve bonnet 118 so that the external valve stem 150 may be rotated clockwise and counterclockwise over a range of less than 360°. The ceramic valve 143 is mounted so that at the clockwise stop the upper ceramic valve hole 147 of the upper ceramic valve disk 146 is located over a solid portion of the lower valve ceramic disk 144. Flow through the ceramic valve 143 is blocked when the external valve stem 150 is at the clockwise stop. Rotation of the external valve stem 150 in a counter clockwise direction results in the placement of the upper ceramic valve hole 147 of the upper ceramic valve disk 146 over the arcuate lower ceramic valve slot 145 of the lower ceramic valve disk 144. This allows mixed water from the mixing chamber 142 to flow at a constant rate into the outer chamber 149 and subsequently out of the thermostatic valve. The ceramic valve 143 remains open as the upper ceramic valve hole 147 is moved over the length of the arcuate lower ceramic valve slot 145 and remains open when the external valve stem 150 is rotated to the counterclockwise stop. Since the area of the upper ceramic valve hole 147 controls the rate of flow of water through the ceramic valve 143, the rate of flow through the ceramic valve 143 is constant over the range of movement of the upper ceramic valve hole 147 in the mobile upper ceramic valve disk 146 over the lower ceramic valve slot 145 in the stationary lower ceramic valve disk 144.

Rotation of the external valve stem 150 in a counterclockwise direction turns on and allows the flow of cold water through the thermostatic valve 100. Continued rotation of the external valve stem 150 in a counterclockwise direction increases the temperature of the water through the thermostatic valve 100 until the maximum temperature is reached at the counterclockwise stop.

Embodiments therefore have the advantage of providing water for the tub or shower at a predetermined temperature, despite variations in the temperature, pressure, or flow rate of the hot and cold water supply. The temperature of the water eventually used in a tub or shower is stabilized by means of passage through the return spring, through a mixing chamber, and through a outlet chamber.

Embodiments include thermostatic valves which comprise, in combination, a valve body with connections to hot and cold water supplies, connections to tub and shower facilities, and means for connection of a knob to a cartridge assembly, and a cartridge assembly with thermostatic means for controlling water temperature and flow from the thermostatic valve. Cartridge assemblies easily may be removed from the body, thereby facilitating the repair or replacement of defective elements as needed. Since components of the cartridge assembly require maintenance and replacement much more often than do components of the body, the provision of a removable cartridge assembly greatly reduces the time, expense, and down-time required in maintenance over the lifetime of the thermostatic valve.

Embodiments are manufactured of suitable hard, non-porous, strong materials such as bronze, steel, stainless steel, and iron. Embodiment thermostatic motor/elements are manufactured of paraffin wax with molecules of a narrow range of carbon chain lengths, allowing expansion and retraction of the thermostatic motor/element stem within a predetermined temperature range. Embodiment ceramic valves are manufactured of suitable hard, durable ceramics such as alumina oxide ceramics.

Embodiments have the disclosed internal/external stem arrangement which provides significant advantages in comparison with conventional valves. This arrangement eliminates a pinch point when closing which has the potential of injury to the fingers of users. It reduces the potential of water getting between the handle and the shower wall. It makes possible an inexpensive anti-ligature handle and eschutcheon for institutional use. Finally, this arrangement eliminates a compression shut-off found in conventional valves which is capable of being over-tightened, causing difficulty in opening the valves.

Embodiments incorporate ceramic shut-off valves which have the advantages of requiring only low torque to operate and having a very long operational life. Low-torque operation is important for showers which comply with the American Disabilities Act and in anti-ligature applications.

Embodiments which include the disclosed shuttle and return spring configuration promote better mixing of the hot and cold waters than conventional configurations.

While a number of exemplary aspects and embodiments have been discussed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope. The applicant or applicants have attempted to disclose all the embodiments of the invention that could be reasonably foreseen. There may be unforeseeable insubstantial modifications that remain as equivalents.

We claim:

1. A thermostatic valve comprising:
   a body with a wall, hot and cold water inlets,
   a cartridge assembly, the cartridge assembly including
      a mixing chamber located within the cartridge assembly, an outlet chamber defined by and located radially between a cartridge assembly wall and the body wall,
      a ceramic valve located within the cartridge assembly at a top of the mixing chamber and a return spring located in a bottom of the mixing chamber, the ceramic valve being moveable between closed and open positions over a range of rotation, a thermostatic motor extending in the mixing chamber and located downstream of the return spring, the thermostatic motor being axially moveable within the cartridge assembly a shuttle attached to and moved by the thermostatic motor in a reciprocating motion, the shuttle including portions at least partially defining the mixing chamber, the shuttle also being attached to the return spring located in the bottom of the mixing chamber, and a rotatable valve stem coupled to the ceramic valve and rotation of the valve stem moving the ceramic valve between the closed and open positions, the ceramic valve being coupled to the thermostatic motor whereby rotation of the ceramic valve over a portion of the range of rotation is synchronously linked to axial movement of the thermostatic motor.

2. The thermostatic valve of claim 1 wherein hot and cold water flow through ports into the bottom of the mixing chamber forming mixed water, and mixed water flows through the return spring, through the mixing chamber, through the ceramic valve at the top of the mixing chamber into the outlet chamber, and from the bottom of the outlet chamber into a shower outlet or into a bath outlet.

3. The thermostatic valve of claim 1 wherein the thermostatic motor comprises a thermostatic motor body and a thermostatic motor stem.

4. The thermostatic valve of claim 1 further comprising stop valves located between the hot and cold inlets and the body wall.

5. The thermostatic valve of claim 1 wherein the ceramic valve comprises a fixed lower ceramic valve disk having an arcuate slot and a mobile upper ceramic valve disk having a hole, the mobile upper ceramic valve disk rotatable in contact with the fixed lower ceramic valve disk with the hole of the mobile upper ceramic valve disk located above the slot of the fixed lower ceramic valve disk.

6. The thermostatic valve of claim 5 wherein flow from the mixing chamber is directed into the slot on the fixed lower ceramic valve disk and is blocked when the hole on the mobile upper ceramic valve disk is not above the slot on the fixed lower ceramic valve disk and is allowed when the hole on the mobile upper ceramic valve disk is above the slot on the fixed lower ceramic valve disk.

7. The thermostatic valve of claim 5, wherein the valve stem further comprises an external valve stem coupled to an internal valve stem, the internal valve stem being rotatable with the external valve stem and being coupled to the mobile upper ceramic valve disk whereby the mobile upper ceramic valve disk rotates with the internal valve stem.

8. The thermostatic valve of claim 1, wherein the ceramic valve comprises a fixed lower ceramic valve disk and a moveable upper ceramic valve disk, the fixed lower ceramic valve disk having portions defining a fluid passageway therethrough, the moveable upper ceramic valve disk also having portions defining a fluid passageway therethrough, the moveable upper ceramic valve disk being rotatable and in contact with the fixed lower ceramic valve disk with the portions defining the fluid passageway in the moveable upper ceramic valve disk being located above the portions defining the fluid passageway of the fixed lower ceramic valve disk.

9. The thermostatic valve of claim 8, wherein the portions defining the fluid passageway in the fixed lower ceramic valve disk define an arcuate slot.

10. The thermostatic valve of claim 8, wherein flow from the mixing chamber is directed into the portions defining the fluid passageway in the fixed lower ceramic valve disk and is blocked when the portions defining the fluid passageway in the moveable upper ceramic valve disk are not above the portions defining the fluid passageway in the fixed lower ceramic valve disk and is permitted when the portions defining the fluid passageway in the moveable upper ceramic valve disk are located above the portions defining the fluid passageway in the fixed lower ceramic valve disk.

11. The thermostatic valve of claim 1, wherein the shuttle includes portions defining a cold water valve seat coupled to the cold water inlet and portions defining a hot water valve seat coupled to the hot water inlet.

12. The thermostatic valve of claim 11, wherein the shuttle defines an axial cold water passageway from the cold water valve seat along a cylindrical inner wall of the shuttle to the hot water valve seat and a radial mixed water passageway defined by the shuttle is configured to direct mixed water adjacent to the hot water valve seat across the return spring and into the bottom of the mixing chamber.

13. A thermostatic valve comprising:
a body with a body wall, the body also including a hot water inlet and a cold water inlet;
a cartridge assembly received within the body, the cartridge assembly including a cartridge assembly wall cooperating with the body wall to define an outlet chamber located radially between the cartridge assembly wall and the body wall, the cartridge assembly further including
a mixing chamber located within the cartridge assembly;
a ceramic valve located within the cartridge assembly at a top of the mixing chamber and having portions defining a passage for mixed water to the outlet chamber, the ceramic valve being moveable between closed and open positions;
a thermostatic motor extending in the mixing chamber and configured to axially move within the cartridge assembly;
a shuttle attached to the thermostatic motor and a return spring and moved by the thermostatic motor in a reciprocating motion, the shuttle at least partially defining the mixing chamber, the shuttle further including a first valve seat and a second valve seat, the shuttle defining an unmixed water passageway axially along a cylindrical wall of the shuttle from the first valve seat to the second valve seat, the shuttle also defining a mixed water passageway radially extending from the second valve seat and directing mixed water into a bottom of the mixing chamber, and
a rotatable valve stem coupled to the ceramic valve and rotation of the valve stem moving the ceramic valve between the closed and open positions, the ceramic valve being coupled to the thermostatic motor whereby rotation of the ceramic valve over a portion of the range of rotation is synchronously linked to axial movement of the thermostatic motor.

14. The thermostatic valve of claim 13, wherein the first valve seat is defined by one end of the shuttle and the second valve seat is defined by the other end of the shuttle.

15. The thermostatic valve of claim 13, wherein the first valve seat is a cold water valve seat coupled to the cold water inlet, and wherein the second valve seat is a hot water valve seat coupled to the hot water inlet.

16. The thermostatic valve of claim 13, wherein the return spring engages and biases the shuttle.

17. The thermostatic valve of claim 16, wherein the return spring is located in the bottom of the mixing chamber.

18. The thermostatic valve of claim 13, wherein the thermostatic motor is wholly located downstream of the return spring.

19. The thermostatic valve of claim 1, wherein the thermostatic motor is wholly located downstream of the return spring.

20. The thermostatic valve of claim 1, further comprising only one handle mounted to the valve stem.

* * * * *